(12) United States Patent
Larnholm

(10) Patent No.: US 10,967,297 B2
(45) Date of Patent: Apr. 6, 2021

(54) CONTINUOUS THROUGH-FLOW SETTLING VESSEL, AND A METHOD OF ADAPTIVE SEPARATION OF A MIXTURE FROM GAS AND/OR OIL EXPLORATION

(71) Applicant: Sulzer Chemtech AG, Winterthur (CH)

(72) Inventor: Per-Reidar Larnholm, Moss (NO)

(73) Assignee: Sulzer Management AG, Winterthur (CH)

( * ) Notice: Subject to any disclaimer, the term of this patent is extended or adjusted under 35 U.S.C. 154(b) by 462 days.

(21) Appl. No.: 15/525,216

(22) PCT Filed: Nov. 11, 2015

(86) PCT No.: PCT/EP2015/076356
§ 371 (c)(1),
(2) Date: May 8, 2017

(87) PCT Pub. No.: WO2016/075206
PCT Pub. Date: May 19, 2016

(65) Prior Publication Data
US 2017/0312654 A1 Nov. 2, 2017

(30) Foreign Application Priority Data

Nov. 13, 2014 (EP) ........................................ 2013793

(51) Int. Cl.
*B01D 17/02* (2006.01)
*B01D 17/12* (2006.01)
(Continued)

(52) U.S. Cl.
CPC ......... *B01D 17/0214* (2013.01); *B01D 17/12* (2013.01); *C02F 1/40* (2013.01); *C02F 2103/10* (2013.01)

(58) Field of Classification Search
None
See application file for complete search history.

(56) References Cited

U.S. PATENT DOCUMENTS 1,897,240 A * 2/1933 Bertil ........................ B04B 1/08
494/37
2,284,737 A * 6/1942 Hirshstein .......... B01D 17/0211
210/539
(Continued)

FOREIGN PATENT DOCUMENTS

CN 2503960 8/2002
CN 101584945 11/2009
(Continued)

*Primary Examiner* — Robert J Popovics
(74) *Attorney, Agent, or Firm* — Larson & Anderson, LLC

(57) ABSTRACT

A continuous through-flow settling vessel for adaptive separation of a mixture from gas and/or oil exploration or production, said mixture comprising a varying mixture of liquid and gaseous phases, wherein the vessel is provided with: an inlet for a mixture, and a gas outlet, a water outlet and an oil outlet, the outlets being provided distant from the inlet, and the oil outlet being downstream of the water outlet, a weir downstream of the water outlet and upstream of the oil outlet, which weir functions as a barrier to a free through-flow in the vessel of the liquid phase which comprises a water phase and an oil phase, which phases are separated from each other by settling, the weir having a height lower than the gas outlet, and wherein the vessel is additionally provided with:—an oil draining means capable of controllably draining oil phase from the vessel upstream of the weir, said means being provided at a level below the weir height and above the water phase that is present during operation of the vessel. Method of adaptive separation of a mixture from gas and/or oil exploration or production, said mixture comprising a varying mixture of liquid and gaseous phases, wherein the mixture is introduced into a continuous through-flow settling vessel.

12 Claims, 4 Drawing Sheets

(51) Int. Cl.
  *C02F 1/40* (2006.01)
  *C02F 103/10* (2006.01)

(56) References Cited

U.S. PATENT DOCUMENTS

| | | | | |
|---|---|---|---|---|
| 2,688,368 A * | 9/1954 | Rodgers | ........... | E21B 41/02 166/267 |
| 2,783,854 A * | 3/1957 | Lovelady | ........... | B01D 19/0042 210/180 |
| 2,825,422 A * | 3/1958 | Schoenfeld | ........... | C10G 33/06 210/115 |
| 2,870,860 A * | 1/1959 | Ray | ........... | E21B 43/34 96/168 |
| 2,998,096 A * | 8/1961 | Snipes | ........... | E21B 43/34 96/161 |
| 3,105,855 A * | 10/1963 | Meyers | ........... | E21B 43/34 585/15 |
| 3,394,530 A * | 7/1968 | O'Neill | ........... | B01D 17/0208 208/187 |
| 3,416,547 A * | 12/1968 | Glenn, Jr. | ........... | E21B 43/34 137/12 |
| 3,578,077 A * | 5/1971 | Glenn, Jr. | ........... | E21B 43/34 137/115.02 |
| 3,672,127 A * | 6/1972 | Mayse | ........... | B01D 17/0208 204/662 |
| 3,675,771 A * | 7/1972 | McKee | ........... | B01D 17/0214 210/800 |
| 3,705,626 A * | 12/1972 | Glenn, Jr. | ........... | E21B 43/12 166/250.15 |
| 3,759,324 A * | 9/1973 | Mecusker | ........... | B01D 17/0217 166/267 |
| 3,782,463 A * | 1/1974 | Palmour | ........... | E21B 43/129 166/105.5 |
| 3,802,501 A * | 4/1974 | Mecusker | ........... | B01D 17/0217 166/75.12 |
| 3,804,252 A * | 4/1974 | Rishel | ........... | B01D 17/0214 210/800 |
| 3,971,719 A * | 7/1976 | Peters | ........... | B01D 17/0214 210/104 |
| 4,059,517 A * | 11/1977 | Strahorn | ........... | B01D 17/0208 210/188 |
| 4,073,734 A * | 2/1978 | Lowrie | ........... | B01D 17/0208 210/532.1 |
| 4,112,706 A * | 9/1978 | Brister | ........... | F25D 3/10 62/50.1 |
| 4,233,154 A * | 11/1980 | Presley | ........... | B01D 17/0214 166/267 |
| 4,304,570 A * | 12/1981 | Kleeberg | ........... | C01B 17/0205 23/293 S |
| 4,386,623 A * | 6/1983 | Funk | ........... | B01D 3/42 137/2 |
| 4,424,068 A * | 1/1984 | McMillan | ........... | E21B 43/34 95/243 |
| 4,429,581 A * | 2/1984 | Furmaga | ........... | E21B 47/10 73/152.31 |
| 4,435,196 A * | 3/1984 | Pielkenrood | ........... | B01D 17/00 96/184 |
| 4,519,815 A * | 5/1985 | Buls | ........... | F17D 1/005 95/259 |
| 4,596,136 A * | 6/1986 | Zacharias | ........... | G01N 29/024 73/61.45 |
| 4,604,196 A * | 8/1986 | Lowrie | ........... | B01D 17/0208 96/176 |
| 4,689,989 A * | 9/1987 | Aslesen | ........... | G01F 1/86 73/61.44 |
| 4,773,257 A * | 9/1988 | Aslesen | ........... | G01F 1/86 73/61.44 |
| 4,776,210 A * | 10/1988 | Baillie | ........... | E21B 49/086 73/61.47 |
| 4,836,017 A * | 6/1989 | Bozek | ........... | E21B 47/102 210/138 |
| 4,956,763 A * | 9/1990 | Stewart, Jr. | ........... | G05D 9/12 137/386 |
| 5,090,238 A * | 2/1992 | Jones | ........... | B01D 19/0063 73/152.42 |
| 5,127,272 A * | 7/1992 | Dean | ........... | G01F 1/74 73/200 |
| 5,132,011 A * | 7/1992 | Ferris | ........... | B01D 19/0042 96/184 |
| 5,149,344 A * | 9/1992 | Macy | ........... | B01D 19/0042 96/159 |
| 5,158,579 A * | 10/1992 | Carstensen | ........... | F17D 1/005 95/271 |
| 5,232,475 A * | 8/1993 | Jepson | ........... | B01D 19/0031 166/267 |
| 5,254,292 A * | 10/1993 | Gabryelczyk | ........... | B01D 19/0042 166/267 |
| 5,256,171 A * | 10/1993 | Payne | ........... | B01D 19/0057 95/157 |
| 5,288,312 A * | 2/1994 | Payne | ........... | E21B 43/34 55/356 |
| 5,322,551 A * | 6/1994 | Payne | ........... | B01D 19/0042 137/207 |
| 5,396,923 A * | 3/1995 | Allen | ........... | F16L 55/045 137/487.5 |
| 5,411,665 A * | 5/1995 | Scraggs | ........... | C02F 3/343 210/610 |
| 5,421,357 A * | 6/1995 | Levallois | ........... | E21B 43/00 137/1 |
| 5,478,504 A * | 12/1995 | de Almeida Barbuto | ........... | E21B 17/01 137/110 |
| 5,494,067 A * | 2/1996 | Levallois | ........... | E21B 43/00 137/154 |
| 5,496,469 A * | 3/1996 | Scraggs | ........... | C02F 3/343 210/177 |
| 5,507,858 A | 4/1996 | Jepson | | |
| 5,544,672 A * | 8/1996 | Payne | ........... | B01D 19/0063 137/1 |
| 5,564,456 A * | 10/1996 | Kolpak | ........... | E21B 43/00 137/13 |
| 5,654,502 A * | 8/1997 | Dutton | ........... | G01N 33/2823 73/152.18 |
| 5,654,551 A * | 8/1997 | Watt | ........... | G01F 1/7042 250/356.1 |
| 5,661,248 A * | 8/1997 | Bernicot | ........... | G01F 1/666 73/861.04 |
| 5,865,992 A * | 2/1999 | Edmondson | ........... | B01D 17/00 210/180 |
| 5,900,137 A * | 5/1999 | Homan | ........... | B01D 17/005 210/85 |
| 5,928,519 A * | 7/1999 | Homan | ........... | B01D 17/005 210/741 |
| 6,017,383 A * | 1/2000 | Jepson | ........... | B01D 53/14 95/149 |
| 6,032,539 A * | 3/2000 | Liu | ........... | G01F 1/74 73/861.04 |
| 6,041,668 A * | 3/2000 | Guieze | ........... | G01N 1/2247 73/863.03 |
| 6,110,383 A * | 8/2000 | Coombs | ........... | B01D 17/00 210/732 |
| 6,134,951 A * | 10/2000 | Scott | ........... | G01F 1/74 73/61.44 |
| 6,187,079 B1 * | 2/2001 | Bridger | ........... | B01D 17/00 96/179 |
| 6,212,948 B1 * | 4/2001 | Ekdahl | ........... | E21B 43/34 166/250.16 |
| 6,214,220 B1 * | 4/2001 | Favret, Jr. | ........... | B01D 17/00 210/188 |
| 6,234,030 B1 * | 5/2001 | Butler | ........... | E21B 21/01 73/195 |
| 6,327,914 B1 * | 12/2001 | Dutton | ........... | G01F 1/8413 73/32 A |
| 6,390,114 B1 * | 5/2002 | Haandrikman | ........... | B01D 19/0063 137/2 |
| 6,413,299 B1 * | 7/2002 | Haukeness | ........... | B01D 19/0042 95/241 |
| 6,499,344 B2 * | 12/2002 | Nelson | ........... | E21B 43/34 166/250.16 |

(56) References Cited

U.S. PATENT DOCUMENTS

| | | | | |
|---|---|---|---|---|
| 6,537,458 B1* | 3/2003 | Polderman | B01D 17/00 | 210/188 |
| 6,716,268 B2* | 4/2004 | Molyneux | E21B 43/01 | 95/22 |
| 6,773,605 B2* | 8/2004 | Nyborg | B01D 19/0063 | 210/741 |
| 6,824,696 B1* | 11/2004 | Tolmie | B01D 17/0211 | 210/801 |
| 6,881,329 B2* | 4/2005 | Amado | B01D 17/0214 | 210/96.1 |
| 7,021,471 B2* | 4/2006 | Abrams | B01D 17/0208 | 210/519 |
| 7,024,951 B2* | 4/2006 | Germond | G01N 1/2035 | 73/863.21 |
| 7,103,521 B2* | 9/2006 | Duret | F17D 1/17 | 703/10 |
| 7,222,542 B2* | 5/2007 | Eken | E21B 43/01 | 73/861.63 |
| 7,284,563 B2* | 10/2007 | Partridge | F17D 1/20 | 137/14 |
| 7,347,945 B2* | 3/2008 | Amado | B01D 17/0211 | 210/739 |
| 7,364,661 B2* | 4/2008 | Puik | B01D 17/12 | 210/744 |
| 7,383,102 B2* | 6/2008 | Coward | G05D 7/0635 | 175/48 |
| 7,395,864 B2* | 7/2008 | Ramachandran | C09K 8/52 | 166/310 |
| 7,434,621 B2* | 10/2008 | Aarvik | E21B 43/00 | 166/267 |
| 7,464,762 B2* | 12/2008 | Duret | E21B 43/01 | 166/357 |
| 7,540,902 B2* | 6/2009 | Esparza | E21B 43/34 | 95/243 |
| 7,684,899 B2* | 3/2010 | Nath | G05D 9/12 | 700/282 |
| 7,771,522 B2* | 8/2010 | Esparza | E21B 43/34 | 96/204 |
| 8,016,920 B2* | 9/2011 | Kouba | E21B 43/36 | 95/261 |
| 8,047,292 B2* | 11/2011 | Ramachandran | F17D 1/17 | 166/310 |
| 8,133,300 B1* | 3/2012 | Gonsalves, III | B01D 19/0042 | 95/19 |
| 8,197,700 B2* | 6/2012 | Beyk | B01D 17/0214 | 210/800 |
| 8,372,294 B2* | 2/2013 | Grotheim | B01D 17/0205 | 210/774 |
| 8,393,398 B2* | 3/2013 | Makogon | E21B 17/01 | 166/345 |
| 8,398,756 B2* | 3/2013 | Whiteley | B01D 17/0211 | 96/184 |
| 8,449,821 B2* | 5/2013 | Sharma | B01D 19/0042 | 422/62 |
| 8,459,285 B2* | 6/2013 | Calvert | F17D 1/16 | 137/14 |
| 8,864,881 B2* | 10/2014 | Suppiah | B01D 19/0036 | 95/249 |
| 9,664,548 B2* | 5/2017 | Henry | E21B 47/10 | |
| 9,840,895 B1* | 12/2017 | Kuhn | B01D 17/042 | |
| 9,982,846 B2* | 5/2018 | Brenskelle | E21B 43/34 | |
| 10,238,992 B2* | 3/2019 | Oshinowo | B01D 17/12 | |
| 10,577,911 B2* | 3/2020 | Morin | E21B 43/34 | |
| 2003/0010204 A1* | 1/2003 | Molyneux | E21B 43/01 | 95/22 |
| 2003/0159986 A1* | 8/2003 | Amado | B01D 17/0214 | 210/521 |
| 2004/0007131 A1* | 1/2004 | Chitty | E21B 21/063 | 95/253 |
| 2004/0011748 A1* | 1/2004 | Amado | B01D 17/0211 | 210/800 |
| 2004/0112150 A1* | 6/2004 | Germond | G01N 1/2035 | 73/863.21 |
| 2006/0151167 A1* | 7/2006 | Aarvik | E21B 43/34 | 166/267 |
| 2008/0264645 A1* | 10/2008 | Shen | F16L 9/00 | 166/357 |
| 2009/0024253 A1* | 1/2009 | Nath | G05D 9/12 | 700/281 |
| 2011/0290108 A1* | 12/2011 | Sharma | B01D 19/0042 | 95/24 |
| 2012/0125868 A1* | 5/2012 | Falappi | B01D 17/0211 | 210/800 |
| 2015/0286755 A1* | 10/2015 | Johansen | G06F 17/5009 | 703/2 |
| 2017/0312654 A1* | 11/2017 | Larnholm | B01D 17/0214 | |
| 2017/0319984 A1* | 11/2017 | Oshinowo | B01D 21/30 | |
| 2017/0342812 A1* | 11/2017 | Kuhn | B01D 17/044 | |

FOREIGN PATENT DOCUMENTS

| | | |
|---|---|---|
| CN | 203355371 | 12/2013 |
| CN | 203756085 | 8/2014 |
| CN | 203847091 | 9/2014 |
| EP | 0615112 A1 | 9/1994 |
| GB | 2236688 A | 4/1991 |
| JP | S63-274408 A | 11/1988 |
| JP | 2014-050811 A | 3/2014 |
| WO | 00/24493 A1 | 5/2000 |

* cited by examiner

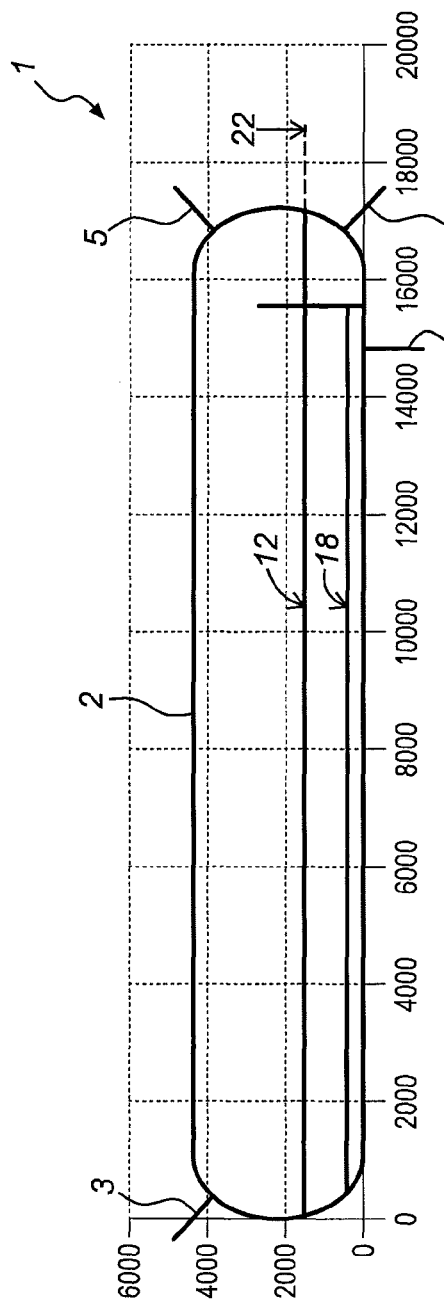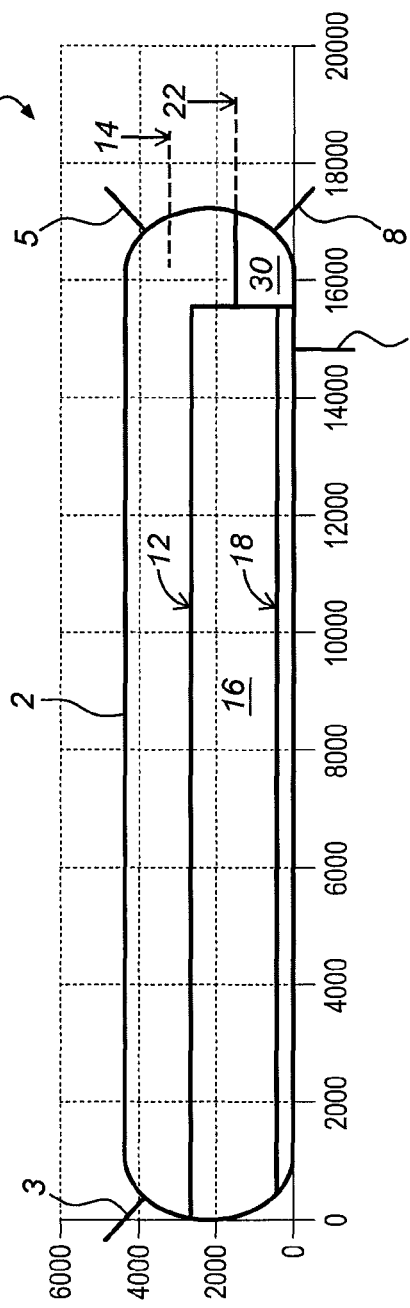

CONTINUOUS THROUGH-FLOW SETTLING VESSEL, AND A METHOD OF ADAPTIVE SEPARATION OF A MIXTURE FROM GAS AND/OR OIL EXPLORATION

The present invention relates to a continuous through-flow settling vessel for adaptive separation of a mixture from gas and/or oil exploration or production, said mixture comprising a varying mixture of liquid and gaseous phases, wherein the vessel is provided with:
- an inlet for a mixture, and a gas outlet, a water outlet and an oil outlet, the outlets being provided distant from the inlet, and the oil outlet being downstream of the water outlet,
- a weir downstream of the water outlet and upstream of the oil outlet, which weir functions as a barrier to the liquid phase which comprises a water phase and an oil phase which are separated from each other by settling, the weir having a height lower than the gas outlet wherein the water outlet is positioned upstream of the weir and the oil outlet is positioned downstream of the weir.

The invention also relates to a method of adaptive separation of a mixture from gas and/or oil exploration or production, said mixture comprising a varying mixture of liquid and gaseous phases,
- wherein the mixture is introduced into a continuous through-flow settling vessel, said vessel provided with:
- an inlet for the mixture, and a gas outlet, a water outlet and an oil outlet, the outlets being provided distant from the inlet,
- and the oil outlet being downstream of the water outlet,
- a weir downstream of the water outlet and upstream of the oil outlet, which weir functions as a barrier to the liquid phase which comprises a water phase and an oil phase which are separated from each other by settling, the weir having a height lower than the gas outlet, wherein the water outlet is positioned upstream of the weir and the oil outlet is positioned downstream of the weir,
- and wherein a normal method of separation involves the continuous controlling of the velocity of flow through the inlet and outlets of the vessel, so that a liquid level of the liquid phase in the vessel is maintained during operation at or below a threshold value between the height of the weir and the height of the gas outlet.

The use of a continuous through-flow settling vessel for separation of a mixture from gas and/or oil exploration, is well known in the technological field. The vessel achieves a first rough separation of the mixture into three phases, i.e. gas, oil and water. Inside the vessel a weir distantly positioned from the inlet forms a barrier to a relatively large volume of liquid which is accumulated upstream of the weir. During the continuous through-flow, this accumulated liquid settles, so that water and oil are separated from each other in distinct phases. The lower lying water phase which is present upstream of the weir is drained from the vessel via a water outlet. The upper part of the liquid is allowed to pass over the top of the weir. This liquid consists mainly of oil which is drained from the vessel via the oil outlet. During the separation of oil and water, the gas phase present in the mixture is led from the vessel via a gas outlet in an upper part of the vessel.

This type of vessel is also referred to in the field as a three-phase separator.

The normal method of separation relies on maintaining the liquid level of the liquid phase in the vessel at or below a threshold value between the height of the weir and the height of the gas outlet. This threshold value is also known in the field as the 'high liquid level' (HLL). When the threshold value is exceeded, the operation may have to be shut down to prevent any liquid from accidentally entering the gas outlet.

In normal operation, this threshold value can be complied with for varying compositions of the mixture, which regularly vary over time with regard to the ratio of oil, water and gas.

However, during operation of the vessel, a so-called slug flow may enter the vessel for a period of time. This slug flow is an inhomogeneity in the mixture which mainly consists of liquid. Inside the pipeline, the slug flow has the dynamical characteristics similar to a plug flow. The slug flow can occur as a result of random accumulations of liquid in the pipeline which eventually clog up the pipeline so that a plug flow is formed. Another type of slug flow is formed when so-called pigs are introduced inside the pipeline. These pigs are plugs snugly fit inside the diameter of the pipeline and are regularly forced through the pipeline in order to purge out all residues from the pipeline. In jargon, this procedure is referred to as pigging.

Dependent on the specific volume of the slug flow, the vessel may be overloaded with liquid in such a way that the HLL is exceeded under normal operation. Such an overload or overflow with an automatic shutdown as a consequence, is to be avoided.

In order to avoid such an automatic shutdown of the vessel operation, it has been proposed to substantially increase the volume of the vessel in order to create a buffer volume which mitigates the volume peak of large slug flows. Still, this additional increase in volume of the vessel requires a substantial investment in space and material.

It is an object of the invention to develop a new method of separation of a mixture from gas and/or oil exploration or production, that is adapted to deal with peak volumes in the mixture from slug flows. Said method should preferably avoid the disadvantages related to the solution of providing the vessel with an increased volume. Furthermore, it is an object of the invention to develop a continuous through-flow settling vessel which is capable to perform such a new method.

Accordingly, the invention relates in a first aspect thereof, to:
a continuous through-flow settling vessel for adaptive separation of a mixture from gas and/or oil exploration or production, said mixture comprising a varying mixture of liquid and gaseous phases, wherein the vessel is provided with:
- an inlet for a mixture, and a gas outlet, a water outlet and an oil outlet, the outlets being provided distant from the inlet, and the oil outlet being downstream of the water outlet,
- a weir downstream of the water outlet and upstream of the oil outlet, which weir functions as a barrier to a free through-flow in the vessel of the liquid phase which comprises a water phase and an oil phase, which phases are separated from each other by settling, the weir having a height lower than the gas outlet,
- and wherein the vessel is additionally provided with:
- an oil draining means capable of controllably draining oil phase from the vessel upstream of the weir, said means being provided at a level below the weir height and above the water phase that is present during operation of the vessel.

As such, the invention achieves that the liquid level of the oil and water phase upstream of the weir, can be drained controllably by an additional oil draining means. By controllably is meant that the status of the oil draining means can be varied between an active and inactive state. Optionally, the amount of draining can be adapted in the active state. In the case that a user is able to determine by means of procedure, sensors or otherwise, a slug flow in the pipeline that is approaching the vessel, it is possible to create a larger free volume above the liquid in the vessel to receive the imminent slug flow, by allowing a large quantity of liquid to be drained from the vessel upstream of the weir. When the draining is complete, the level of the liquid is declined to the height where the oil draining means is in fluid communication with the vessel. Accordingly, an additional free volume is created in which the slug flow can be received. The free volume is adapted to receive a large slug flow, such as can be expected from a slug flow that is created by pigging. Such a vessel thus is suitable to adaptively separate mixtures from oil and gas exploration or production, without the need of an increased volume of the vesselin order to prevent an overflow by a large volume of liquid from a slug flow.

The common design of the vessel is an elongate, closed cylinder. In operation, the vessel is positioned with a horizontal orientation of the main axis of the cylinder.

It is preferred in continuous through-flow settling vessel according to the invention that the oil draining means comprises at least one duct with a controllable valve that is in fluid communication with the upstream side of the weir and preferably also with the downstream side of the weir.

To be able to create an adequate additional free volume, it is preferred that the entry side of the duct is provided in the vessel at a height between 0.10 and 0.75 of the weir height, preferably between 0.20 and 0.60 of the weir height. In general, the entry side of the duct should be as low as possible, while still fulfilling the separation requirements for the oil and water phases.

In a particular embodiment of the settling vessel according to the invention, it is preferred that the duct extends through the weir and is in fluid communication with the upstream and downstream side of the weir.

Such a duct can be expediently provided in the weir without the need of many modifications to the vessel. The draining of the liquid phase is subsequently achieved via the vessel compartment upstream of the weir and the subsequent oil outlet.

In another embodiment of the settling vessel according to the invention, it is preferred that the duct is an auxiliary liquid outlet from the vessel upstream of the weir, optionally merging with the oil outlet outside of the vessel, or optionally in fluid communication with the vessel downstream of the weir.

Such an auxiliary liquid outlet can be an alternative to, or be combined with a duct through the weir as described above. Dependent of the two above optional embodiments, the draining of the liquid phase from the vessel is either achieved directly and merges with the oil outlet, or is accomplished via the vessel compartment downstream of the weir and subsequently via the oil outlet.

It is also encompassed by the continuous through-flow settling vessel according to the invention that the oil draining means is provided by the weir having an adaptive height, so that the weir height can be reduced below the original height at normal operation, also referred to as 'weir height' in this description. The adapted lower height allows then for an oil draining from the compartment of the vessel upstream of the weir. The weir height can be adapted for instance by providing the weir with a top part that can be rotated downward so as to lower the overall height. Alternatively, the weir as a whole may be provided as a vertically moveable construction, which allows the weir to be moved downwards within the vessel.

With further preference, a continuous through-flow settling vessel according to the invention, comprises controlling means for controlling the velocity of flow through the inlet and outlets of the vessel, so that a liquid level of the liquid phase in the vessel is maintained at or below a threshold value between the height of the weir and the height of the gas outlet.

Such a vessel allows for an automated setting of the liquid level of the liquid phase during normal operations.

Preferably, in a continuous through-flow settling vessel according to the invention, the controlling means are adaptable to allow the liquid level upstream of the weir to decline to or below an adaptive height which is lower than the threshold value.

Such a vessel allows for an automated setting of the liquid level of the liquid phase during a preparation phase in advance of a slug flow entering the vessel.

In particular it is preferred, in a continuous through-flow settling vessel according to the invention, that the controlling means allow temporarily the increase of outflow using the water outlet, the oil outlet, and/or the oil draining means in order to decline the liquid level to or below the adaptive height upstream of the weir.

It is particularly advantageous when temporarily the increase in water outflow, is combined with an increased oil outflow via the oil draining means. As such the total liquid level is declined more rapidly.

In a second aspect, the invention relates to a method of adaptive separation of a mixture from gas and/or oil exploration or production, said mixture comprising a varying mixture of liquid and gaseous phases, wherein the mixture is introduced into a continuous through-flow settling vessel, said vessel provided with:

an inlet for the mixture, and a gas outlet, a water outlet and an oil outlet, the outlets being provided distant from the inlet, and the oil outlet being downstream of the water outlet, a weir downstream of the water outlet and upstream of the oil outlet, which weir functions as a barrier to a free through-flow in the vessel of the liquid phase which comprises a water phase and an oil phase, which phases are separated from each other by settling, the weir having a height lower than the gas outlet, and wherein a normal method of separation involves the continuous controlling of the velocity of flow through the inlet and outlets of the vessel, so that a liquid level of the liquid phase in the vessel is maintained during operation at or below a threshold value between the height of the weir and the height of the gas outlet, and wherein the adaptive separation comprises the steps of:

determining the presence in a pipeline of an inhomogeneity in the mixture which is mainly liquid, also referred to as a slug flow, before it enters the inlet of the vessel;

during a phase A which precedes the slug flow entering the vessel:

lowering the liquid level of the liquid phase in the vessel upstream of the weir to or below an adapted height lower than the threshold value; and during a subsequent phase B which includes the slug flow entering the vessel:

allowing the liquid level to rise above the adapted height in the vessel upstream of the weir, and subsequently maintaining the liquid level at or below the threshold value.

Such a method achieves that an additional free volume is created above the liquid level in which the slug flow can be received. The free volume is adapted to receive a large slug flow, such as can be expected from a slug flow that is created by pigging. Accordingly, the method avoids the need of an increased volume of the vessel in order to prevent an overflow by a large volume of liquid from a slug flow.

The determination of the slug flow in the pipeline is for instance performed by sensors inside the pipeline, and/or by calculations based on the mixture velocity and the moment and place at which a pig has been introduced in the pipeline.

Phase B does not necessarily have to include the very first moment that the slug flow exits the inlet and starts entering the vessel. Phase B may start with a small delay after the first moment of the start of the slug flow entering the vessel.

It is preferred in the method according to the invention, that during phase A, the volume of oil phase in the vessel upstream of the weir is reduced.

In particular it is preferred in the method according to invention, to include the use of an oil draining means capable of draining liquid phase from the vessel upstream of the weir and below the weir height.

Such oil draining means may be of any type as already described above in regard of the first aspect of the invention.

In the method according to the invention, it is preferred that during phase A, the volume of water phase upstream of the weir is reduced.

Such can be accomplished for instance by increasing the outflow through the water outlet. The reduction of volume of water additionally contributes to the overall reduction in volume of the liquid phase.

Further preferred in the method according to the invention, is that the normal method of separation additionally involves the water level of the water phase in the vessel upstream of the weir to be maintained during operation at or below a water threshold value.

Another preferred variant of the method according to the invention, includes that during phase A, the water level of the water phase in the vessel upstream of the weir is maintained at or below value which is lower than the water threshold value.

As such, the liquid level as a whole is further reduced, with the advantages already discussed above.

An especially preferred method according to the invention, involves that a continuous through-flow settling vessel is used according to the first aspect of the invention discussed above, wherein in phase A the oil draining means are in an active mode for draining, and in phase B these means are not in an active mode for draining.

The invention is further explained with reference to the appended drawings, wherein:

FIGS. 2A and 2B show the same vessel as FIG. 1, during different phases of operation;

Figure 1:
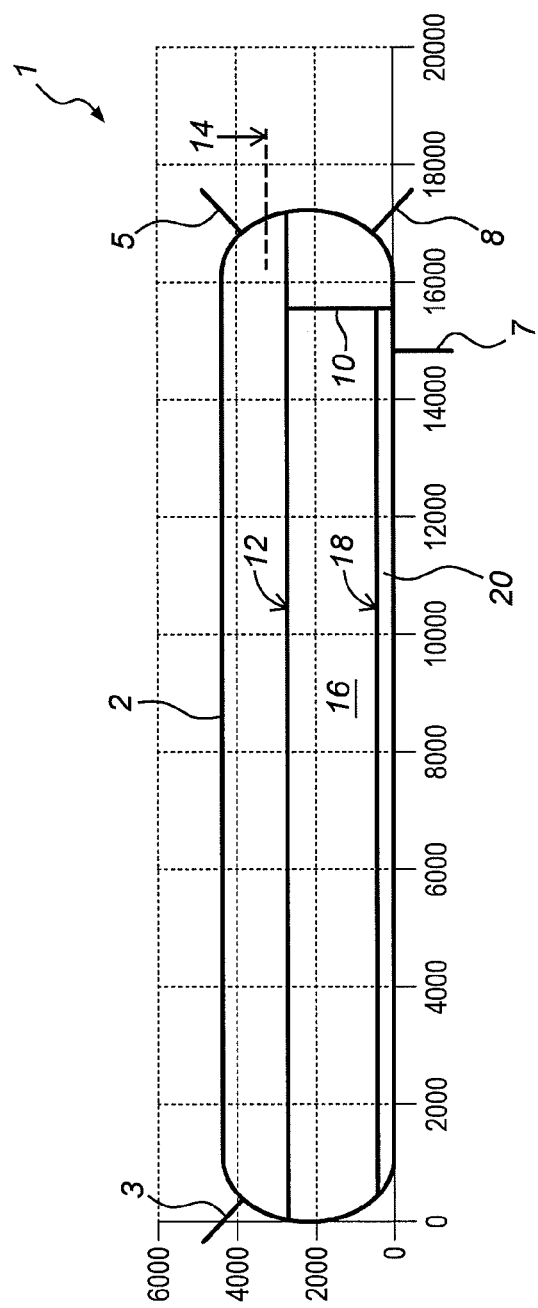
FIG. 1 is a schematic representation of a preferred embodiment of the continuous through-flow settling vessel according to the invention, in cross-section and during normal operation.

FIG. 1 shows a continuous through-flow settling vessel 1, made out of a closed cylindrical wall 2, having an inlet 3 for a mixture, a gas outlet 5, a water outlet 7 and an oil outlet 8. The outlets are all provided with a controllable valve (not shown). The direction of the mixture inside the vessel is from left to right. A weir 10 is placed inside the vessel the top of which is below the high liquid level 14 which is the upper threshold value for liquid inside the vessel. Upstream of the weir 10, a volume of separated liquid is present consisting of an oil phase 16 and a water phase 20. The interface 18 marks the water level upstream of the weir. The surface 12 marks the liquid level inside the vessel which is the same at the upstream side and the downstream side of the weir 10. FIG. 1 shows the vessel during normal operation, wherein controlling means (not pictured) coordinate the exit flow through the outlets 5, 7, 8 by virtue of the respective valves, so as to accomplish a steady state wherein a large volume of liquid upstream of the weir is allowed to settle and separate into an oil and a water fraction.

FIG. 2A shows the same vessel 1, during a phase A which precedes the slug flow entering the vessel, wherein the liquid level 12 of the liquid phase in the vessel upstream of the weir is lowered to or below an adapted height 22 which is lower than the threshold value 14. The lowering is accomplished by increasing the exit flow via the water and oil outlets 7,8, and also via an additional duct which is in fluid communication with the upstream side of the weir. The additional duct is provided at the adapted height 22, and is shown in various forms in FIG. 3A-C. In phase A, also the water level 18 is lowered in comparison to the normal operation shown in FIG. 1.

FIG. 2B shows the phase B, which follows after phase A, wherein the slug flow has fully entered the vessel. The liquid level 12 is allowed to rise above the adapted height 22 in the vessel upstream of the weir, and is subsequently maintained at or below the threshold value 14. In this phase B, the additional duct is closed off. In the situation shown, there is not yet an overflow of liquid from the slug flow that spills over the weir 10 and reaches the side downstream of the weir. Therefore the liquid level of the oil volume 30 at the downstream side of the weir is lower in comparison to the upstream side.

Figure 3A:
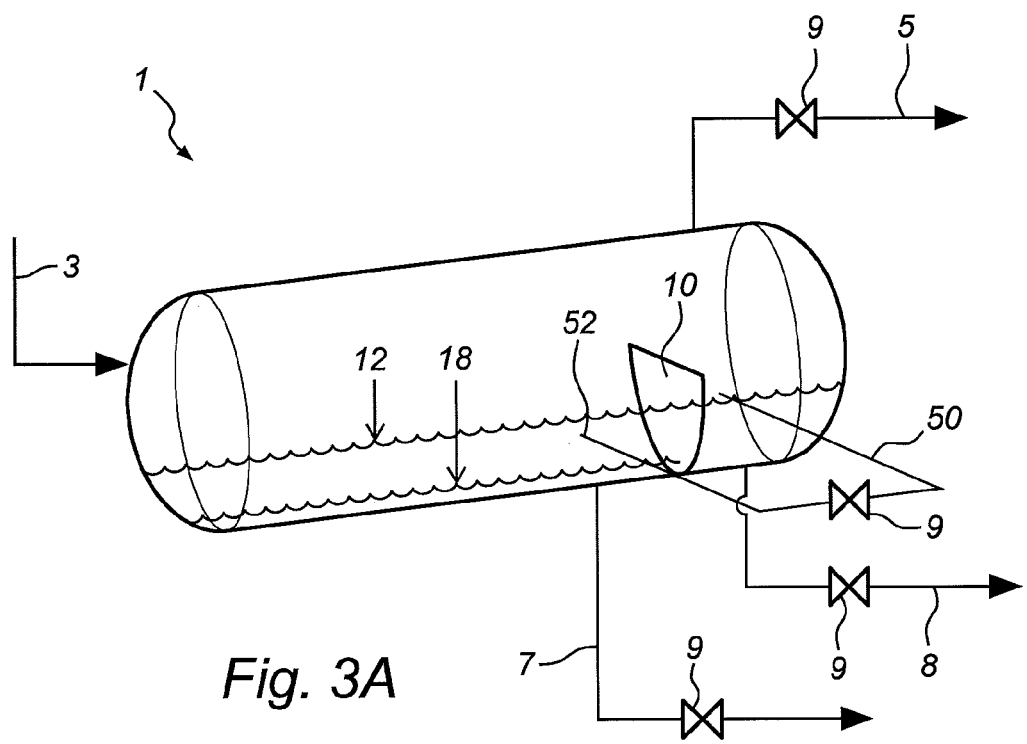
FIGS. 3A and 3B show two preferred embodiments of an additional duct according to the invention.

FIG. 3A shows the vessel 1 corresponding to the vessel of FIG. 2A, which is provided with a first type of an additional duct 50, which is a bypass channel outside the vessel which is in fluid communication with the upstream and downstream side of the weir 10. The additional duct is provided with a controllable valve 9. All other outlets 5, 7, 8 are also provided with valves 9. The height of the liquid phase 12 corresponds with the height of the entry side 52 of the additional duct 50, which is the adapted height according to the invention.

Figure 3B:
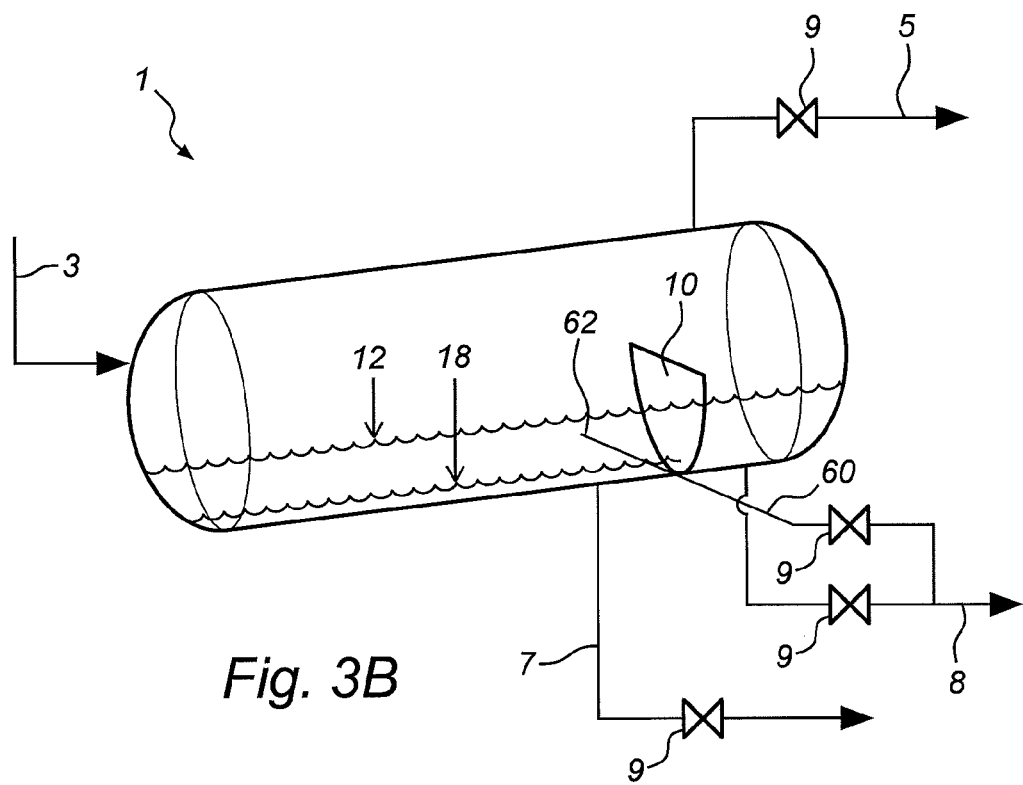

FIG. 3B shows the vessel 1 corresponding to the vessel of FIG. 2A, which is provided with a second type of an additional duct 60, which is an auxiliary outlet from the vessel which is in fluid communication with the upstream side of the weir 10. The auxiliary outlet is provided with a controllable valve 9. The height of the liquid phase 12 corresponds with the height of the entry side 62 of the additional duct 60, which is the adapted height according to the invention. The auxiliary outlet merges with the oil outlet 8 downstream of the valves 9.

Figure 3C:
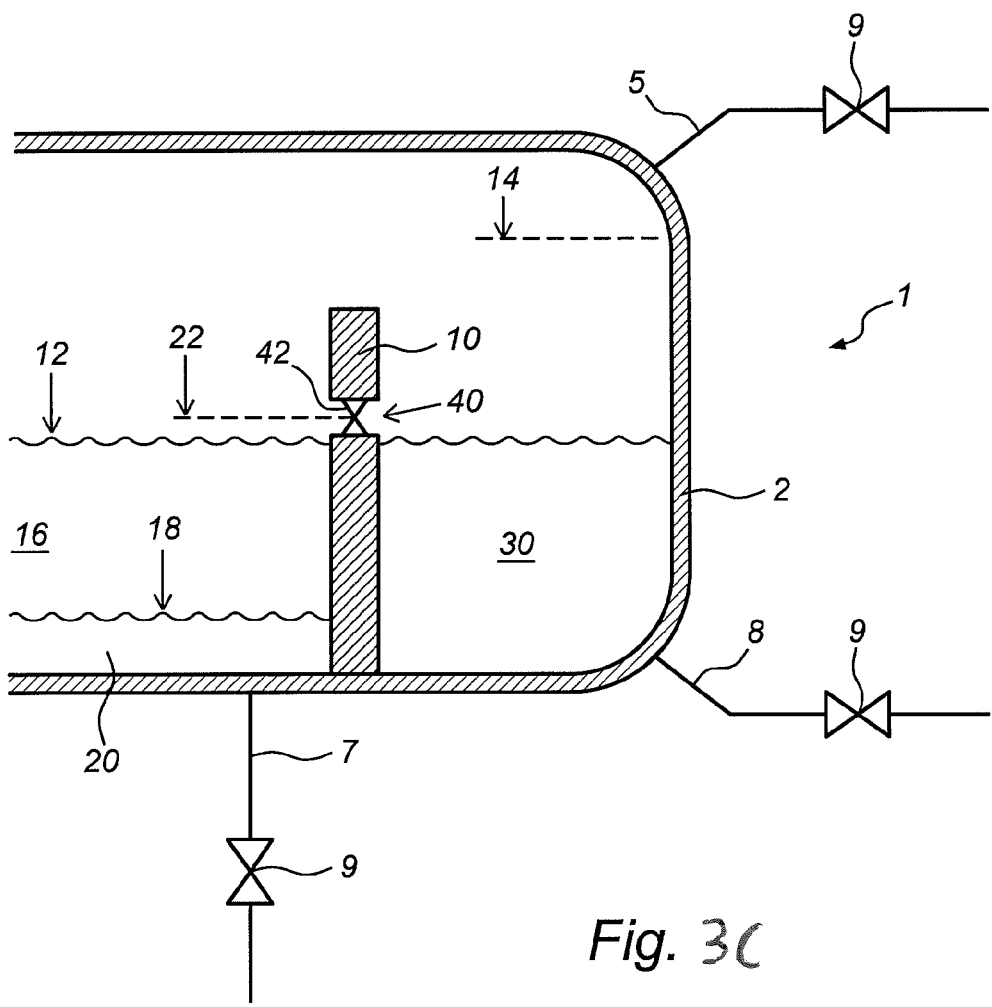
FIG. 3C shows a third preferred embodiment of an additional duct according to the invention.

FIG. 3C shows schematically the right hand side of the vessel as shown in FIG. 2AB, which is provided with a third type of an additional duct. The weir 10 is provided with a an additional duct 40 through the weir which is in fluid communication with the upstream and downstream side of the weir, and is provided with a controllable valve 42.

The additional duct 40 is provided at an adapted height 22.

The valve 42 is closed off, so that a rise of the liquid level upstream of the weir is accomplished.

For all the above three types of additional ducts 40, 50 and 60, it is possible by opening of the respective valve 9 or 42, respectively of the additional duct, to achieve a lowering of the liquid level upstream of the weir, in anticipation of a slug flow having a substantially larger volume of liquid, which is accommodated for by the invention.

The invention claimed is:

1. A method for separation of a mixture from gas and/or oil exploration or production, said mixture comprising a varying mixture of liquid and gaseous phases,
    wherein the mixture is introduced into a continuous through-flow settling vessel, said vessel provided with:
    an inlet for the mixture, a gas outlet, a water outlet and an oil outlet, the outlets being provided distant from the inlet, and the oil outlet being downstream of the water outlet,
    a weir downstream of the water outlet and upstream of the oil outlet, which weir functions as a barrier to a free through-flow in the vessel of the liquid phase which comprises a water phase and an oil phase, which phases are separated from each other by settling, the weir having a height lower than the gas outlet,
    and wherein the method of separation involves the continuous controlling of the velocity of flow through the inlet and outlets of the vessel, so that a liquid level of the liquid phase in the vessel is maintained during operation at or below a threshold value between the height of the weir and the height of the gas outlet,
    and wherein the separation comprises the steps of:
        determining the presence in a pipeline of a slug flow, said slug flow being an inhomogeneity in the mixture which is mainly liquid, before it enters the inlet of the vessel;
        during a phase A which precedes the slug flow entering the vessel:
            lowering the liquid level of the liquid phase in the vessel upstream of the weir to or below an adapted height lower than the threshold value; and
        during a subsequent phase B which includes the slug flow entering the vessel:
            allowing the liquid level to rise above the adapted height in the vessel upstream of the weir, and subsequently maintaining the liquid level at or below the threshold value; and
    wherein the continuous through-flow settling vessel is additionally provided with: an oil draining means capable of controllably draining oil phase from the vessel upstream of the weir, said means being provided at a level below the weir height and above the water phase that is present during operation of the vessel,
    wherein in phase A the oil draining means are in an active mode for draining, and in phase B these means are not in an active mode for draining.

2. The method according to claim 1, wherein during phase A, the volume of oil phase in the vessel upstream of the weir is reduced.

3. The method according to claim 1, wherein during phase A, the volume of water phase upstream of the weir is reduced.

4. The method according to claim 1, wherein the method of separation additionally involves the water level of the water phase in the vessel upstream of the weir to be maintained during operation at or below a water threshold value.

5. The method according to claim 4, wherein during phase A, the water level of the water phase in the vessel upstream of the weir is maintained at or below value which is lower than the water threshold value.

6. The method according to claim 1, wherein the oil draining means of the continuous through-flow settling vessel comprises at least one duct with a controllable valve that is in fluid communication with the upstream side of the weir.

7. The method according to claim 6, wherein the duct extends through the weir and is in fluid communication with the upstream and downstream side of the weir.

8. The method according to claim 6, wherein the entry side of the duct is provided in the vessel at a height between 0.10 and 0.75 of the weir height.

9. The method according to claim 6, wherein the duct merges with the oil outlet outside of the vessel, or alternatively, is in fluid communication with the vessel downstream of the weir.

10. The method according to claim 9, wherein the controlling means are adaptable to allow the liquid level upstream of the weir to decline to or below an adaptive height which is lower than the threshold value.

11. The method according to claim 6, which comprises controlling means for controlling the velocity of flow through the inlet and outlets of the vessel, so that a liquid level of the liquid phase in the vessel is maintained at or below a threshold value between the height of the weir and the height of the gas outlet.

12. The method according to claim 11, wherein the controlling means allow temporarily the increase of outflow using the water outlet, the oil outlet, and/or the oil draining means in order to decline the liquid level to or below the adaptive height upstream of the weir.

* * * * *

UNITED STATES PATENT AND TRADEMARK OFFICE
CERTIFICATE OF CORRECTION

| | | |
|---|---|---|
| PATENT NO. | : 10,967,297 B2 | Page 1 of 1 |
| APPLICATION NO. | : 15/525216 | |
| DATED | : April 6, 2021 | |
| INVENTOR(S) | : Per-Reidar Larnholm | |

It is certified that error appears in the above-identified patent and that said Letters Patent is hereby corrected as shown below:

On the Title Page

Item [30], should read:
Foreign Application Priority Data
Nov. 13, 2014 (NL) ........................................ 2013793

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*